May 19, 1925.
J. D. TUCKER
SPRING AXLE
Filed Feb. 6, 1923
1,538,494
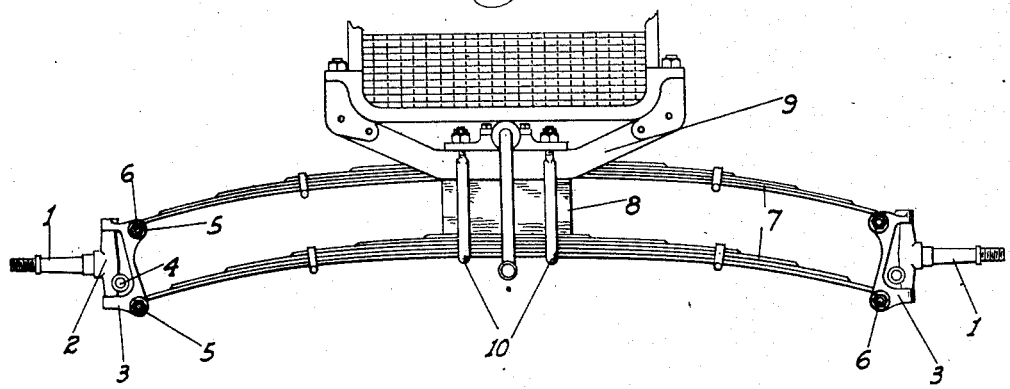
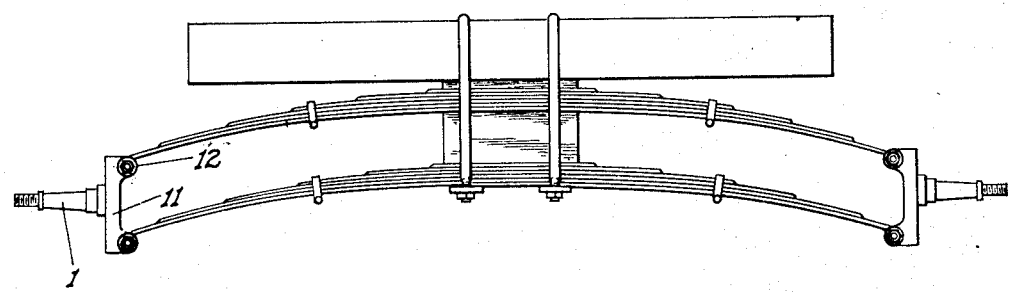
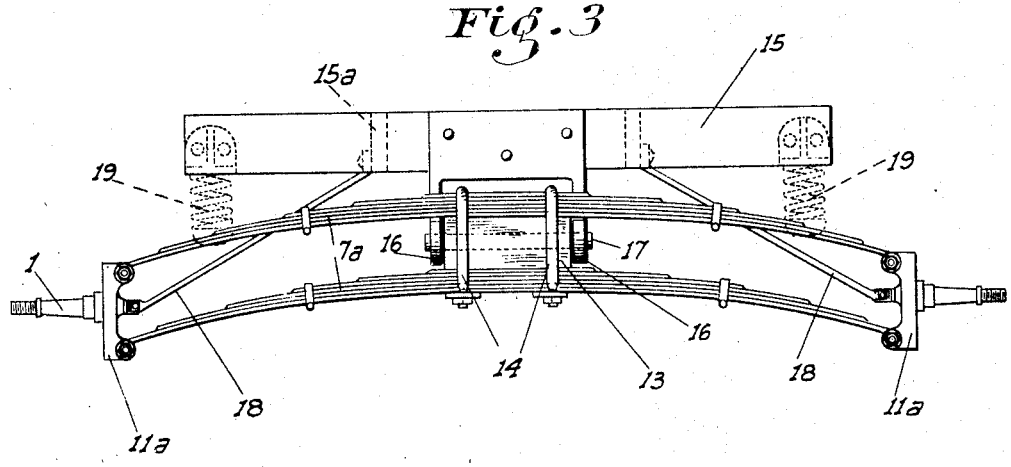
INVENTOR.
Jesse D. Tucker
BY
ATTORNEY Patented May 19, 1925.

1,538,494

UNITED STATES PATENT OFFICE.

JESSE D. TUCKER, OF SACRAMENTO, CALIFORNIA.

SPRING AXLE.

Application filed February 6, 1923. Serial No. 617,262.

*To all whom it may concern:*

Be it known that I, JESSE D. TUCKER, a citizen of the United States of America, residing at Sacramento, county of Sacramento, State of California, have invented certain new and useful Improvements in Spring Axles; and I do declare the following to be a full, clear, and exact description of the same, reference being had to the accompanying drawings, and to the characters of reference marked thereon, which form a part of this application.

This invention relates to improvements in vehicle-chassis construction, the principal object being to combine the features of wheel axles and their spring suspension means into a single unit, by making the axle itself as a spring member.

A vehicle thus equipped will have a spring action equal to that obtained with present construction, while the cost of manufacture, and the number of parts involved, will be lessened considerably.

I have especially in mind to apply my improved spring axle structure to both ends of trailers such as are drawn by trucks, etc., but it is also suitable for use as the front axle of any vehicle, motor driven or otherwise, and for the rear axles of those motor vehicles, such as trucks, which have chain drives to the rear wheels instead of the usual direct axle-drive with a differential interposed.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a front view of my spring axle, as applied to the front end of a certain make of automobile.

Fig. 2 is a similar view showing a form of spring axle suitable for non-steering or rear wheel use.

Fig. 3 is a similar view of the axle, showing a modified form of mounting the same.

Referring now more particularly to the characters of reference on the drawings, the numeral 1 denotes in all views transversely spaced and horizontal spindles, on which suitable wheels are mounted in the usual manner.

In Fig. 1, the vertical spindle bodies 2 are turnably mounted in yokes 3, said bodies having provision as at 4 for connecting steering-spindle arms thereto, as is customary with front-axle practice on either motor vehicles or their trailers.

Formed on the yokes at the upper and lower ends thereof facing opposite to the spindles are ears 5 to receive bolts or pins 6 which form supports for the eyes on the ends of vertically spaced leaf springs 7, preferably quite flat and parallel to each other, which extend between and connect the yokes, the springs being both the same length, and each pair of pins 6 being of course in a common vertical plane.

A rigid block 8 is placed between the springs centrally of their ends, the springs, and block being rigidly clamped to each other and to a transverse frame member 9 of the vehicle by means of transversely spaced strap or U-bolts 10.

It will be evident that with this construction, the spindles may have vertical movement relative to the frame independently of each other, and they will always lie in planes parallel to their normal plane due to the equal length of the springs, each of the latter being the same as two separate springs, as far as the action is concerned.

For rear axle use, as shown in Fig. 2, the pivoted spindle-bodies are omitted, their place being taken by rigid bodies 11 which have the spring-connecting ears 12 formed thereon.

In Fig. 3 I have shown a form of mounting of the spring-axle which, while allowing of a spring action fully as flexible as those already described, has means for preventing absorbing or taking up the inevitable horizontal strains at the ends of the springs and longitudinally of the vehicle. This either enables the use of lighter or narrower springs, or enables the structure to be used in heavy-duty work without unduly increasing the width of the springs and massiveness of the structure generally.

In this form of the device, the springs 7$^a$ are connected as before to the spindle bodies 11$^a$ as in Fig. 2, or to spindle-yokes as in Fig. 1, with the central block 13 therebetween, this block and the spring being clamped together by straps 14 independent of the transverse frame 15 of the vehicle.

Fixed on and depending downwardly from the latter are ears or brackets 16, these ears projecting between the springs at opposite ends of the block 13 and in alinement with the latter.

A pin 17 is passed through said ears and block, so that the entire spring axle structure is pivoted on and supported by the ears.

Pivoted on the spindle bodies 11ª in a plane parallel to but below the pin 17 are brace rods 18, these rods extending away from said bodies to suitable flexible connections with the longitudinal or other frame members 15ª beyond the frame 15.

If the structure is a rear axle, these rods extend forwardly thereof, and if a front axle, the rods of course extend rearwardly. In one position the rods are in tension and in the other they are in compression, and in either case they act to brace the relatively weak outer ends of the springs against undue strains and distortion in a direction fore and aft of the vehicle.

The pivotal mounting of the axle structure, as well as of the rods, is of course necessary in this case, since with any vertical deflection of the springs, the adjacent ends of the rods move through an arc, and the spindle bodies must therefore be enabled to move to follow this arc also.

Should it be desired for heavy service, more leaf springs, in vertically or horizontally spaced relation, may of course be employed, or additional spring means may be provided in the shape of coil compression springs as indicated at 19, placed between the upper main spring and the adjacent frame member.

The structure in Fig. 3 has been shown as applied to rear on non-steering axles, but it may of course be applied to front axles of the type shown in Fig. 1 or others.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the sprit of the invention, as defined by the appended claims.

Having thus described my invention, what I claim as new and useful and desire to secure by Letters Patent, is:

1. A spring axle structure for vehicles comprising spindles, a pair of spring elements spaced apart and connected to opposite ends of the spindles, a block secured between the springs midway of their ends, a depending bracket on the vehicle, ears on the bracket projecting between the springs and adjacent opposite ends of the block, a pivot pin pivotally connecting the ears and block to allow the springs a pivotal movement on a horizontal axis transversely of the vehicle, and means for limiting such pivotal movement.

2. A spring axle structure for vehicles comprising spindles, a pair of spring elements spaced apart and connected to opposite ends of the spindles, a block secured between the springs midway of their ends, a depending bracket on the vehicle, ears on the bracket projecting between the springs and adjacent opposite ends of the block, a pivot pin pivotally connecting the ears and block to allow the springs a pivotal movement on a horizontal axis transversely of the vehicle, and means for limiting such pivotal movement, such means including rods pivoted to the spindles intermediate their ends and to the vehicle at points a distance from the vertical plane of the axle.

In testimony whereof I affix my signature.

JESSE D. TUCKER.